US009574861B2

(12) United States Patent
Nath et al.

(10) Patent No.: US 9,574,861 B2
(45) Date of Patent: Feb. 21, 2017

(54) REMOTELY DETECTABLE AMMUNITION

(71) Applicants: Nihaal Nath, West Orange, NJ (US);
Rattan Nath, West Orange, NJ (US)

(72) Inventors: Nihaal Nath, West Orange, NJ (US);
Rattan Nath, West Orange, NJ (US)

( * ) Notice: Subject to any disclaimer, the term of this patent is extended or adjusted under 35 U.S.C. 154(b) by 175 days.

(21) Appl. No.: 14/324,877

(22) Filed: Jul. 7, 2014

(65) Prior Publication Data
US 2015/0007741 A1    Jan. 8, 2015

Related U.S. Application Data

(60) Provisional application No. 61/957,523, filed on Jul. 5, 2013, provisional application No. 61/958,034, filed on Jul. 18, 2013.

(51) Int. Cl.
| H04Q 5/22 | (2006.01) |
|---|---|
| F42B 35/00 | (2006.01) |
| F42B 12/36 | (2006.01) |
| G06K 19/07 | (2006.01) |
| H04B 5/00 | (2006.01) |
| G06K 19/077 | (2006.01) |
| F42B 5/02 | (2006.01) |
| F41A 17/06 | (2006.01) |

(52) U.S. Cl.
CPC ............... F42B 35/00 (2013.01); F42B 12/36 (2013.01); G06K 19/0711 (2013.01); *F41A 17/063* (2013.01); *F42B 5/02* (2013.01); *G06K 19/07749* (2013.01); *H04B 5/0062* (2013.01)

(58) Field of Classification Search
CPC ......... F41A 17/063; F41A 17/00; F41A 17/02; F41A 31/00; F41A 35/00; F41C 33/029; F24B 35/00; F24B 5/02; G06K 17/00; G06K 19/07749; G06K 2017/0045; G06K 7/10366; G08B 13/1427; G08B 13/2402; G08B 13/2417; G08B 25/016
See application file for complete search history.

(56) References Cited

U.S. PATENT DOCUMENTS

| 7,112,445 | B1 * | 9/2006 | Welle ...................... F42B 12/36 436/56 |
|---|---|---|---|
| 7,676,973 | B1 * | 3/2010 | Powers ..................... F41A 3/10 42/17 |
| 8,199,014 | B1 * | 6/2012 | Kindeberg ........... H04B 5/0062 340/10.1 |

(Continued)

*Primary Examiner* — Kerri McNally
*Assistant Examiner* — Renee Dorsey
(74) *Attorney, Agent, or Firm* — Rattan Nath

(57) ABSTRACT

Disclosed is tagged ammunition, methods for making it, using it and detecting it to reduce gun violence. When implemented together with a smart phone coupled readers, standalone readers, or at a security center, software is included to allow integration of signals detected by multiple readers in the vicinity to map detectable ammunition detected by readers designed to detect tagged ammunition as a proxy for loaded firearms. This makes possible securing an area of interest, when combined with placing of at least one networkable reader in the vicinity of the area of interest; and connecting the one or more readers to a monitoring center. Such monitoring centers may be associated with schools, shopping malls, streets, public meetings, public events, housing complexes, an area being swept for loaded guns, an area being monitored for gang activity, or even a residence.

20 Claims, 9 Drawing Sheets

(56) References Cited

U.S. PATENT DOCUMENTS

| | | | |
|---|---|---|---|
| 2005/0262751 A1* | 12/2005 | Leslie | F41A 17/063 |
| | | | 42/70.01 |
| 2006/0244612 A1* | 11/2006 | Pridmore, Jr. | F42B 12/382 |
| | | | 340/573.2 |
| 2011/0043378 A1* | 2/2011 | Bailey | G08G 1/07 |
| | | | 340/917 |
| 2011/0061280 A1* | 3/2011 | Emde | F41A 17/063 |
| | | | 42/70.06 |
| 2011/0165569 A1* | 7/2011 | Macula | C12Q 1/6806 |
| | | | 435/6.11 |
| 2011/0181399 A1* | 7/2011 | Pollack | G06K 19/0717 |
| | | | 340/10.33 |
| 2011/0248833 A1* | 10/2011 | Ritamaki | G06K 19/0705 |
| | | | 340/10.33 |
| 2012/0310529 A1* | 12/2012 | Hamilton | G01C 21/32 |
| | | | 701/433 |
| 2013/0256412 A1* | 10/2013 | Yeh | G06K 7/10316 |
| | | | 235/439 |

* cited by examiner

REMOTELY DETECTABLE AMMUNITION

This application claims priority from U.S. Provisional Patent Application No. 61/957,523 filed on Jul. 5, 2013 and from U.S. Provisional Patent Application No. 61/958,034 filed on Jul. 18, 2013.

FIELD OF THE INVENTION

The present invention relates to ammunition that is detected by its response to signals from a Reader or by its default signals, and methods of making and using the ammunition. Further, such ammunition makes possible detection of loaded firearms and large amounts of ammunition in locations where it poses a hazard. Specifically the invention makes possible provision of security in defined locations by allowing covert detection. Examples of such locations include schools, malls, busy public places and other places where loaded firearms are prohibited or at the very least tightly regulated.

In a preferred embodiment, such ammunition may even be manufactured using a conventional processing methodology. The each piece of ammunition contains therein a miniaturized Radio Frequency Identification Device ("RFID") tag and/or an Ultrasonic Identification Device ("UID") within it. In a preferred embodiment such RFID or UID tags (collectively or in the alternative referred to as "ID tags") are placed in the primer portion of each piece of ammunition as well as elsewhere inside each piece of ammunition.

BACKGROUND OF THE INVENTION

Efforts to control the ownership and use of guns have posed a legal and social challenge. Regulating the use of guns, in particular loaded guns, poses challenges in America. In many other countries the right to own and use a firearm is severely curtailed or even absent. In the United States, on the other hand, the right to bear arms guaranteed in the Constitution precludes outright right regulation of firearms to the extent of depriving most citizens of firearms. While many folks insist on responsibly using their guns in hunting and self-defense, the availability of guns empowers others to commit crimes. There is no way to a priori distinguish between the two types of individuals. The US Constitution assures due process and precludes prejudging a person as being a threat to society absent some overt act or indication. Add to the mix the expectation of not being unreasonably searched, and one has the mix for making possible mass shootings, rage killings, and firearm accidents.

Since, some policies adopted in foreign jurisdictions with low gun violence—the banning of gun ownership—are not practical in jurisdictions like the United States, there are no good answers. The measures adopted so far, such as profiling based on race, gender and ethnicity run, if implemented sufficiently generously, afoul of other Constitutional assurances. As a result the first intimation of a shooter is when the shooting has already started. Despite this reality, reducing gun violence to improve public safety presents a long-standing unmet need.

Just about every functional gun poses the risk of violence—provided it is loaded. Conventional cartridges for rifles and machine guns, as well as larger caliber weapons are usually made with brass casings or composite casings that include metal, plastic, paper or combinations thereof. The casing includes an integrally formed head containing a primer cup to receive a primer adapted to ignite a charge at one end, and at the other end provides a mechanical fit to a bullet. The grip of the cartridge upon the bullet, together with the amount and characteristics of the powder/charge, the interior volume of the powder chamber and other factors determine the chamber pressure levels developed during the firing cycle. The bullet or other projectile is held in place with a crimp or frictional engagement, the strength of which is a factor in determining the pressure needed to initiate bullet movement into the barrel of the rifle.

Cartridges are typically made with bullets in metal casing. Shot gun cartridges may have paper or plastic shell casings. It has been known to make shell casings with materials such as plastic, which provide less shielding against electromagnetic signal reception and transmission compared to metal casings. U.S. Pat. No. 2,654,319 discloses a sectional cartridge including a plastic shell that will be converted to gas during the firing phase to assist in propelling the projectile and thereby permit reduction in the use of the propelling powder charge. U.S. Pat. No. 3,026,802 discloses a cartridge made using light weight thermoplastic materials. U.S. Pat. No. 3,745,924 discloses a plastic cartridge whose ballistics are equivalent to existing metallic cartridges and which can be fired in existing firearms. U.S. Pat. No. 3,842,739 discloses a plastic cartridge with a cartridge case having a plastic body has a metallic tubular mouth member affixed thereto, which may be crimped to securely hold a projectile. U.S. Pat. No. 3,874,294 discloses a center fire cartridge case for high pressure cartridges with a plastic body and a metallic head. U.S. Pat. No. 3,977,326 discloses a composite cartridge casing having a plurality of component parts, which may be of dissimilar materials such as metal and plastic.

There are additional patents that teach the making of hybrid cartridges that have non-shielding materials as part of their body, which improves transmission of electromagnetic signals. For instance, U.S. Pat. No. 3,952,657 discloses plastic shell receiving a propellant charge with even the cartridge being expelled by the ignited gases from a rifle to approximate a shell-less cartridge. U.S. Pat. No. 4,147,107 discloses plastic shell with a metal bottom that is suitable for rifles. The '107 patent explains that the "use of a plastics material for ammunition cartridge cases offers considerable advantages over usual metal cases in regard to cost and production, but necessitates a bottom insert of metal which is suitable as a groove or edge for engaging the usual cartridge extractor and ejector and for receiving and holding a detonator or percussion cap". U.S. Pat. No. 5,151,555 discloses plastic cartridges suitable for rapid-fire weapons. The '555 patent's disclosed cartridge has a plastic case with a pressure regulating baffle or wall. The '555 patent teaches that a plastic rifle cartridge should have a metal cap or head to carry the primer and to provide the ejection groove necessary to eject the spent cartridge from the firing chamber. When used in a modern automatic weapon the need is also present for a reinforced cap or head area to contain residual pressures in the cartridge occasionally encountered when the ejection cycle begins removal of the cartridge from the chamber before the pressure effects of the recent firing have fully dissipated. U.S. Pat. No. 8,186,273 discloses that plastic casings for ammunition may be made using injection molding processes for combat ammunition, target ammunition and blanks.

There are patents describing the improvements and variant ammunition designs that modify the primer or the bullet part of a piece of ammunition or both to achieve delayed detonation of some part of the charge such as U.S. Pat. No. 4,216,722 disclosing an exploding bullet with more than one primer portion built therein. U.S. Pat. No. 4,222,330 describes cartridge ammunition with known magnetic tags for identification therein for rifles and pistols, particularly for civilian use. Ammunition is of two basic types: center-fire and rimfire. The projectile portion is fitted into a casing portion. An explosive material, such as smokeless gunpower, is disposed within the casing and sealed therein by the projectile portion of the cartridge. Additionally, in center-fire ammunition there is disposed a primer located at the end of the casing opposite the open end into which the projectile is fitted. The primer comprises a primer case and a primer explosive which is typically detonated by the impact of a firing pin on the primer case. Thus, in center-fire ammunition cartridges, the detonation of the primer acts to detonate the main explosive powder charge which accelerates the projectile along the barrel of the rifle or pistol into which the cartridge has been inserted. Rimfire ammunition cartridges work in the same way except that the primer explosive is not centrally located and typically is not disposed in its own casing. The presence or absence of magnetic particles with defined Curie temperatures allows tagging of the ammunition to identify it after the firing of the ammunition.

U.S. Pat. No. 4,009,060 describes a shapeable primer composition that can be solidified from a melt state into a solid of a desired shape. It should be noted that there are many additional primer compositions known that provide other benefits from prolonged lifetimes to other detonation related parameters. U.S. Pat. No. 4,142,441 describes a primer seating tool for centerfire cartridges. U.S. Pat. No. 4,189,980 describes a method and device for reloading a centerfire cartridge. U.S. Pat. No. 4,149,465 describes an improved ammunition cartridge with modifications to the primer portion.

One way to limit firearm mediated violence is to introduce identification tools to allow quick identification of perpetrators to dissuade violent acts. Many identification devices and methods of making them for use with firearms are known. In particular, it is known how to identify retail purchasers of ammunition cartridges and even the bullets within them. Typically a physically readable mark serves as an identifier, which mark is placed either directly on the bullet, on a casing of a bullet, or on a barrel of a gun. In addition there are devices that can store information about a buyer or handler of ammunition in an electronic memory in the cartridge—as is described, for instance in U.S. Pat. No. 7,533,614. Many additional identification strategies are disclosed in U.S. Pat. Nos. 6,293,204; 6,462,302; and 6,886,284. This list is not exhaustive with many ways to mark a serial number and the like proposed over time.

Such tracking of buyers or possessors of ammunition in a database is difficult to manage, and raises privacy concerns. Another limitation is that it is more difficult to effectively manage distinct identifiers, as they are constrained by the physical limitations of the bullet surface on which marking can occur. Still another significant limitation is that by applying different marks to munitions cartridges requires changing the manner in which such ammunition cartridges are made from a bulk manufacturing process, in which all ammunition cartridges are made the same way, to a batch manufacturing process, in which different batches of ammunition cartridges are made (such as divided by the box size of the ammunition cartridge), in order apply a different identifier to all the ammunition cartridges in a single box.

But even more significantly being able to track the last buyer or possessor of ammunition is of little use in preventing accidental or deliberate incidents and the problem of minimizing or at least reducing undesirable gun violence remains unsolved.

SUMMARY OF THE INVENTION

The present invention is directed to easily detectable ammunition, and methods of detecting, making and using the same.

Briefly, disclosed is a piece of ammunition detectable by a reader. The piece of ammunition comprises a tag located in a primer portion of the piece of ammunition; a power storage component to power a signal emitting circuit in the tag; and a receiver for receiving power or a signal external to the piece of cartridge.

To protect against tampering, the tag in the piece of ammunition is located in the primer section of the piece of ammunition. The primer section is preferably coupled to the cartridge housing during manufacturing the piece of ammunition.

The power source for the piece of ammunition is selected to be a passive energy storage component charged by an external reader or an energy storage component charged by mechanical vibrations. The mechanical vibrations are received by the receiver and converted into electrical power by way of a miniaturized cantilever and a piezoelectric material. The passive energy storage component is charged by ultrasonic radiation following conversion into electrical energy or by electromagnetic waves.

The piece of ammunition using its signal emitting circuit emits an electromagnetic signal or an ultrasonic signal. Preferably this emission is in response to (a) receiving a query signal; or (b) upon sufficient energy being stored in the passive energy storage component. However, in some exemplary embodiments the emission may be periodic to discharge the passive energy storage component. The signal emitting circuit responds to a signal from a reader by emitting a signal indicating the presence of the tag, in effect setting up a query respond cycle to facilitate its discovery by a remote reader.

When using electromagnetic radiation, the tag may change its impedance at two or more rates periodically to allow a reader to detect the change in the impedance seen at the reader. Alternatively, the tag may reflect back the signal received from the reader following a time delay.

In some embodiments the tag may be powered by a battery but be designed to continue functioning as a passive tag if the battery runs out. In such embodiments the tag located in a primer section may be a remnant of a semi-passive Radio Frequency Identifier after a built in battery runs out. In addition to conventional batteries, the choices of batteries for the tag include a solid electrolyte sandwiched between metal electrodes that also function as a structural part of the piece of ammunition.

In another aspect, also disclosed is a reader of detectable ammunition, with the detector comprising a power and signal port compliant with specifications for a smart phone to allow plugging in the reader into a smart phone; and a detector for receiving a signal from detectable ammunition. Some examples of such power and signal port specifications are the Universal Serial Bus specifications, IEEE 1394 specifications and the like.

When detecting ultrasonic signals, the detector may be a directional detector of ultrasonic signals. Thus, with the direction of the detected signal known, it is easier to locate the ammunition or loaded firearm in the vicinity.

When implemented together with a smart phone or at a security center, software is included to allow integration of signals detected by multiple readers in the vicinity to map detectable ammunition. This makes possible a method for securing an area of interest. Such an exemplary method may comprising the steps of placing at least one networkable reader in the vicinity of the area of interest; and connecting the one or more readers to a monitoring center responsive to the detection of ammunition detectable via passive or semi-passive Radio Frequency Identifiers. Advantageously the monitoring center may be associated with one or more of a school, a shopping mall, a street, a public meeting, a public event, a housing complex, an area being swept for loaded guns, an area being monitored for gang activity, and a residence where firearms are prohibited or controlled.

Also, the invention may be realized in the form of a primer section detectable by a reader, the primer section comprising a tag; a power storage component to power a signal emitting circuit in the tag; and a receiver for receiving power or a signal external to the piece of cartridge. In such a primer section, which may be used to make individual cartridges by individuals, the power signal emitting circuit reflects back the signal received from the reader or changes its impedance to signal the reader; and includes a thermal fuse coupled to the tag so that excessive current induced in the thermal fuse triggers the primer explosive. This makes the primer section tamper resistant. The primer section may be powered by a vibration detecting circuit that harvests power for the tag from vibrations, wherein furthermore the harvested vibrations are low frequency mechanical vibrations or ultrasonic vibrations. Further, the tag in the primer section may respond at a second frequency in response to detecting the reader and the presence of at least another tag in its vicinity, or the tag may attempt to synchronize its response with the transmissions of the at least another tag with the detection by a reader made easier by the increased synchronization.

These exemplary and illustrative embodiments allow detection of a person carrying ammunition at any time in public places instead of having to focus on detecting, banning, or tracking guns and their owners. We propose requiring placing at least one tag—radio frequency or an Ultrasonic based tag—in a piece of ammunition. An UID tag is detectable with a receiver for receiving sound waves while a RFID tag is detectable by electromagnetic radiation. The tags may be energized by radiofrequency waves or ultrasonic waves or by vibrations—such as those due to walking and moving. Such a tagged piece of ammunition can then be detected using an RFID Reader or a Sonic Tag Reader (hereinafter 'Reader'). Suitably placed networked Readers in locations of interest or carried by security personal detect the presence of ammunition—including of a person with a lot of ammunition—even in a crowd without having to pat down everyone for a search. Triangulation allows multiple Readers to locate ammunition and, thus, individuals carrying loaded guns or capable of loading guns. As a result it becomes possible to better ensure security in locations where there is a particular risk of casualties or where security requires that people not carry firearms. Since it is significantly more difficult to tamper with bullets than with guns, such detectable bullets makes firearm safety easier to implement than it is presently—since the Readers are networkable—including possible facilities for automatically informing the police and security service as well as triggering emergency and preventive measures whenever the presence of excessive ammunition is detected to minimize harm to the public and give a heads up to the police and relevant security services.

Preferably one places at least one tag (hereinafter 'Identifiers') in the primer part of the ammunition. The tag may also be placed in the shot and outside or anywhere else in the bullet as well. A passive ID tag placed in the primer section is difficult to tamper with since the primer compound is selected for its instability and tendency to explode in response to percussion. If a piece of ammunition has multiple ID tags then it is impractical to get rid of all of the passive ID tags or to neutralize them without also compromising the ammunition and making it unsuitable for use in a firearm. Not surprisingly, the expected safe time and manner to place the ID tags in the ammunition is during manufacturing the ammunition or primer sections.

Further, the cylindrical design of a bullet may be exploited by using it as a reflector by placing ID tags(s) at about half the radius of the casing—which corresponds to the focus. With such placement, symmetric or non-symmetric, of ID tags in a piece of ammunition it is possible for passive tags to harvest energy received from a Reader more efficiently and to use it then to send out a signal for detection by the Reader.

In another aspect, in a preferred embodiment, ammunition is made detectable but not traceable. This aspect makes possible security in various locations but without compromising privacy.

Further, such ID tags are compatible with many other technological approaches proposed for making firearms safer. Using passive ID tags is just our preferred embodiment that is cheap and suitable for automated mass manufacturing of ammunition.

In another preferred embodiment, to make detectable ammunition, it is possible to provide a source of power, such as a battery, but the ID tags used should still be capable of functioning as passive ID tags if the source of power fails or runs out. Thus, powered tags will have more range, but the ammunition will still remain detectable even if the battery runs out.

A passive ID tag does not have a battery. The passive tag receives all of its power from the Reader. In practice, the wavelength band for communicating and powering the passive RFID corresponds to a wavelength that is much larger than the dimension of the passive RFID—at least those deployed in the primer section of a piece of ammunition. Properly speaking a small passive RFID arguably does not have an antenna. The passive RFID, when powered by the Reader, couples to it electromagnetically and changes its impedance periodically. The Reader detects this change in impedance as the signal from the RFID. In our preferred embodiment the RFID does not have to provide any information other than indicating the presence of ammunition. This allows significant simplifications in the design and fabrication of RFIDs as well as lowering of their cost to just pennies for each such RFID because with a simple design there are fewer rejected tags.

The presence of metal in a bullet requires designing bullets such that detection of RFIDs in them is enabled in the presence of the metal shell. Some examples of metallic devices that receive electromagnetic radiation, including near field coupling—as is the case with passive RFIDs—include iPhones, or laptops with metal cases. In each of these antenna are carefully integrated into the design of the device. In ammunition antennas can be built into the design as well. As an example metal jacket of a shell may function as an antenna if it is designed with two or more metal segments to allow detection of a signal. Such a device will detune in the presence of other metal parts—such as the gun barrel and a magazine. However, the changes in the signal reveal the presence of such parts in proximity to the tagged ammunition.

Passive RFIDs cost about 15 cents or less and can be made very small—small enough to have dimensions of less than two tenths of a millimeter on each side without the antenna structure. The cost can be lowered for simple designs by reduction in the reject rate and with large volume manufacturing. Coupling these dust mote sized pRFIDs to a micro-patch antenna structure is a way to accommodate RFIDs in a primer section of a cartridge. RFIDs in mass production should cost much less than 15 cents because they only need to make their presence known to the reader instead of having to store and transmit a lot of data like a serial number. In our preferred embodiment the more bullets there are the easier it is to detect the bullets because the multiple RFIDs do not interfere with each other's detection since only the presence of a piece of ammunition is being detected rather than having to distinguish between signals encoding extensive numeric or other data.

The passive RFID has a range of about 1-15 meters. That is more than enough to facilitate timely detection of such tagged ammunition. They are also the cheapest so the price of each piece of ammunition goes up less than 15 cents each. Hitachi has managed to manufacture RFIDs exclusive of the antenna—having a size of about 0.15 mm by 0.15 mm and with a thickness of about 60 microns. Advantageously the simpler pRFIDs envisaged by this disclosure can be place in a cartridge with the cartridge metal providing some of the antenna functionality—for example by way of a micro-patch antenna configuration that is built in. If the antenna is overloaded to burnout the RFID, a fuse causes the ammunition to also be triggered and thus inactivates it.

You can design RFID readers like a metal detector at the airport or a strip underground your feet. The metal detector design will be good for a school, hospital, shopping malls, universities and theaters. The random strips will be good for Time Square, and the White House, and the Pentagon.

The preferred RFID does not require a code number or number of production on the RFID to function. All it has to do is to say to the detector "Hi I am a cartridge, now sound the alarm—especially if there are too many of us". Preferably to ensure detection even when other RFIDs—non-cartridge related—are present, in a preferred embodiment, the pRFID in a cartridge switches its impedance between two or more levels at two or more rates (other than just reflecting back the RFID reader signal in some embodiments). Thus, while other RFIDs are designed to communicate more information, the minimal information communicated by the preferred pRFIDs allows easy detection of ammunition with little or no effect due to collisions and the like at the RFID reader. Thus, since these RFIDs are easily detectable especially if the guy has a lot of bullets it is easier to detect the presence of ammunition reliably than by screening relying on searching bags, or metal detectors or soft X-rays and the like. For stores you can make a RFID reader that performs two tasks, one for tracking the clothes and other sundry inventory and one mode for the bullets or program the RFID reader to detect ammunition as well as its normal detection of clothes and signals related to other inventory type tasks. With ammunition required to be responsive to an RFID reader, and with RFIDs in the primer part of a cartridge, tampering with ammunition to inactivate the RFID becomes difficult and an activity that allows detection of such efforts. This makes the pRFID enabled detectable ammunition hardened against attempts at shielding it since the shielding means can be detected by metal detectors.

In particular disclosed is a method of securing an area of interest against the risk of mass shootings-including on an ongoing basis. The disclosed method comprise the steps of placing at least one Radio Frequency Identifier reader in the vicinity of the area of interest, and ensuring that the entire area of interest is covered by one or more Radio Frequency Identifier readers. Then with the one or more readers connected to a monitoring center responsive to the detection of ammunition detectable via passive or semi-passive Radio Frequency Identifiers allows detection and a fast response to a threat identified by the detection of ammunition. For a response it is preferred that the monitoring center be a police station, or comprise security personal, specially where monitoring center is associated with one or more of a school, a shopping mall, a street, a public meeting, a public event, a housing complex, an area being swept for loaded guns, an area being monitored for gang activity, and a residence where firearms are prohibited or controlled.

In a particular embodiment, the identification device is a detection enhanced munitions cartridge. The detection enhanced cartridge can be manufactured using a conventional bulk processing methodology. The bullet of the cartridge contains therein a detection enabling device within it. Methods of manufacture and using the detectable ammunition cartridge are also described.

In view of this possible solution, Congress may pass a law requiring all ammunition or primer assemblies sold to the public—at least for civilian use—be detectable by RFID readers. If excess military inventory of ammunition is to be disposed, it must be by making it inactive and the importation of non-conforming ammunition or primer assemblies prohibited. This technical solution allows people to use guns where they have a right to do so safely. Such a law will prevent a person from carrying too much ammunition and becoming a danger to others. Notably our invention does not prevent people from having guns or requires tracking them in any way—it merely prohibits the presence of functioning firearms or enabling ammunition in places where they should not be present. It does not lessen the need for vigilance, but rather makes make vigilance more effective. And most notably it is a sharp departure from the alternative proposals that make ammunition more lethal (exploding bullets) or intrusive into privacy of individuals and instead fulfills the longstanding need for a solution to the problem of flagging armed individuals—without requiring racial profiling or unreasonably arbitrary guess work—to prevent or reduce the harm from mass shootings.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
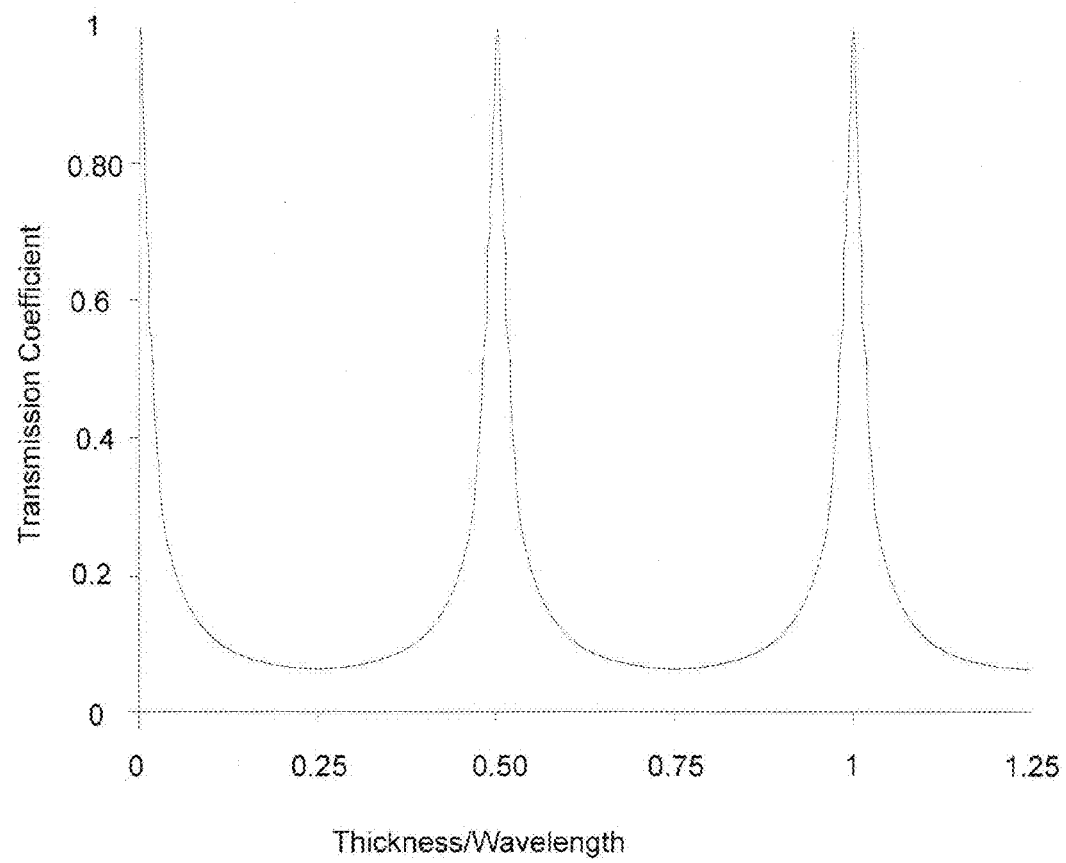
FIG. 1 depicts the variation in the transmission coefficient of ultrasonic waves through Plexiglas and steel as a function of the ratio of the thickness of the material and the wavelength of the ultrasonic waves.

In recent times, mass shootings in public places remain a problem. In a mass shooting a man/woman would carry a large amount of ammo, and an automatic weapon(s) into a public place. Examples of public places are crowded places like the Time Square, hospitals, schools, shopping malls, universities and theaters. Then he/she attempts to murder as many people as possible. Now only if we could stop them . . . .

A normal piece of ammunition consists of, a primer, black powder, and the projectile. The piece of ammunition works when the hammer hits the cartridge in the back, it compresses the fulminate against an anvil. This percussion causes the primer to explode. Through a hole in the primer section the flash reaches the gunpowder and causes it to ignite. In turn, this ignition results in the generation of a lot of gas and that pushes the bullet out. The bullet spins if the barrel is rifled because it gives a more accurate shot. Al of this is believed to be well-known to one having ordinary skill in the art.

For additional clarity included herein are the meanings of a few terms. A tag is a small electrical circuit that may be embedded in an object like a cartridge or a primer section of a cartridge to facilitate detection of the tagged object. Such tags are encountered as theft deterrent and detection system components at department stores and malls routinely. The tags for tagging a cartridge need to be much smaller than the cartridge or the compartment of the cartridge in which the tag is placed. Such tags can be made rather small if their circuit is simplified as well. Here the tags do not carry extensive identification information beyond advertising their presence. Hence they do not raise invasion of privacy concerns since they function only to facilitate the presence of ammunition or loaded firearms.

Detection of people or a person carrying ammunition at any time in public places goes a long way to make such places secure against gun violence. Requiring by law that each piece of ammunition be remotely detectable, say at a distance of no less than 10 meters in order to enter the stream of commerce in the United States will allow effective detection of most threats to public safety.

Preferably all ammunition should have multiple tags so it is very hard to get rid of all of them without revealing the effort or compromising the ammunition itself.

The passive RFIDs may be in the primer, the shot (for shotguns) and on the outside and in the wad. This makes it very hard to get rid of every tag without compromising the ammunition. A Passive tag does not have a battery. A passive tag receives all of its power from the reader. The passive RFID tag, when powered by the reader, couples to it and changes its internal resistance. The reader detects the change in resistance as the signal from the RFID tag. However, the presence of metal in a cartridge makes detecting RFID tags harder but by placing an antenna on the outside allows detection and transmission of an electromagnetic signal. Some examples of metal cases that receive and transmit electromagnetic signals are cell phones and laptops with metal cases.

In an exemplary embodiment, the more bullets there are the easier it is to detect the bullets because the multiple tags do not interfere with each other's detection. Indeed, in most instances collisions between the signals from many tags make detection of ammunition easier rather than harder to detect due to their tendency to synchronize their transmissions.

The passive tag does not have a battery so no bullets would explode due to it. Of course, passive tags with batteries could be used but these may have the difficulty of having the battery running down resulting in a non-detectable piece of ammunition. It may be possible to design the tag such that it can continue to work as a passive tag even after the battery runs out, but while the battery is present the tag allows better detection by providing more power.

The passive tag has a range of about 1-15 meters though it could be as much as ten time more in the best passive tags. That is more than enough to allow effective detection of ammunition where security needs exist. Passive tags are also the cheapest tags so the price of each piece of ammunition goes up by very little.

Tag readers may be placed like a metal detector at the airport or a under a floor. Such placement will be suitable for a school, hospital, shopping malls, universities and theaters as well as outdoors in locations such as Time Square in Manhattan, N.Y., and the White House, the Pentagon, and other high value targets.

The tag does not need to store or transmit a code number or a production number. All it has to do is to say to the detector "Hi I am present". These tags are even more easily detectable when a dangerous guy has a lot of ammunition. The RFID readers at malls and stores may be modified to also detect ammunition. For example one for the clothes and one for the bullets or the same one to detect both.

Naturally, given this technical solution to crime prevention and monitoring, the US Congress should pass a law requiring that all ammunition sold to the public be detectable by tag readers. Such a law will let people use guns wherever they have a right to do so. Thus, without encumbering the right to bear arms, or tracking all gun owners, the tags and systems and methods disclosed herein allow misuse of guns.

The present invention is directed to an identification device and a method of making and using the same. The preferred embodiment of the identification device, as described, is for usage in an ammunition cartridge. It will be apparent; however, that there are aspects of the present invention that can be applied for use in identifying retail purchasers of devices other ammunition cartridges, and as such this detailed description should be so interpreted.

It is also noted, however, that an aspect of the preferred embodiment of the present invention is that the identification device is solely for the purpose of associating the identity of an associated retail purchaser, without having other components, and as such is distinguished from identification devices that are within and part of much larger systems.

I. Tagged Ammunition

Types of Tags:

We have broadly considered two types of tags, one or both of which may be included in a piece of tagged ammunition such that the tag responds when it is interrogated by a reader. First is a tag with Radio Frequency Identification (RFID) functionality. Second is a tag with Ultrasonic Identification (UID) capability. At the very least, the tag should announce its presence when interrogated by a Reader. Such tagged ammunition will be effective only if civilians are required to use only such ammunition by law.

Ammunition Structure:

A piece of ammunition includes a casing and a bullet. Upon firing a weapon, the casing remains with the weapon and is subsequently ejected. The bullet is accelerated out of the barrel of the weapon and becomes the projectile. The casing has inserted in it a primer section. The primer section presents an area to be struck by the hammer of the firearm, which ignites a primer compound in the primer section. This ignition causes a flash to from the primer explosive to reach the secondary explosive in the casing and ignite it. This secondary explosive turns into hot gases that act as the propellant for ejecting the bullet.

Ammunition Casings and Shielding:

Some pieces of ammunition may have plastic or paper casings or, as is more typical, a metal casing. With paper or plastic casings it is easier for RFID based tags to communicate with an external reader. Metal casings provide electromagnetic shielding, which makes it difficult to power RFID based tags or for signals from such tags to reach the external reader. In such metal casings an antenna or similar functionality may be built-in to facilitate communications with the external reader.

Primer Portion:

is the part of a cartridge that includes the primer. Typically this structure has an end that is struck by the hammer in civilian firearms. In military ammunition many primer portions are present in complex arrangements to allow munition to detonate at different times and places following the original firing or deployment. Here the civilian munitions typically include no more than two primer portions with just one primer portion being the most common form.

In an alternative approach, instead of relying on RFIDs, the use of ultrasonic waves allows communication with UIDs placed in the piece of ammunition. Ultrasonic waves have a transmission coefficient that is a function of the thickness of the material. If the thickness is a multiple of quarter wavelengths, the transmission coefficient reaches a maximum value that may be as high as almost 1. This dependence is illustrated in FIG. 1 for materials like Plexiglas and steel. Thus, it is possible to select an ultrasound wavelength calculated to allow a signal to get through to a tag placed inside a piece of ammunition and to receive at an external reader a signal from the tag. It is possible to design tags to work with a selection of frequencies—like musical keys in an octave—to target most barrier thicknesses.

Tradeoffs:

There are tradeoffs in choosing the type of tags—those responsive to electromagnetic radiation versus those using ultrasonic waves. Electromagnetic radiation provides easier detection and wideband radiation to cover an area of interest. On the other hand, ultrasonic waves can more easily reach areas shielded from electromagnetic radiation but tend to be very directional, that is have a much smaller solid angle, both for their generation and detection. However, with ultrasonic tags detection can be raster-scanned to get wide angle coverage and sensitive microphones can detect very low levels of signals, thus making possible detection at large distances. The ultrasonic spectrum is also far cleaner than electromagnetic spectrum, which would improve the signal to noise ratio.

Figure 2:
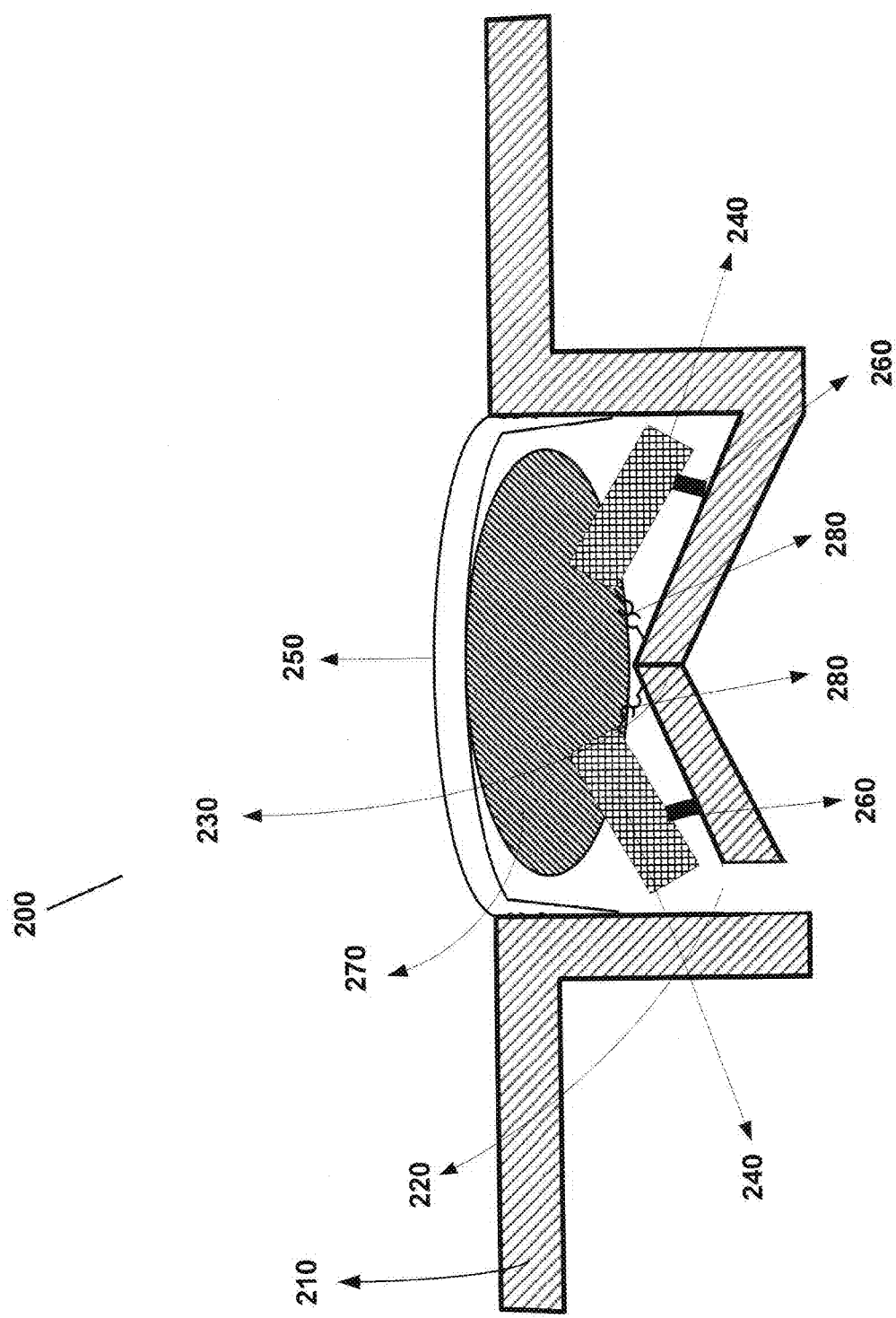
FIG. 2 is a schematic of the primer section 200 of a piece of ammunition showing an ammunition shell engaging part 210 with a flash vent 220, an anvil 230, tags 240, primer cap 250, fuses 260, primer compound 270 and a mechanical support 280 for tag 240.

Tamper resistance may also be provided in implementing tag detected ammunition. FIG. 2 shows a possible placement scheme for a tag in the primer section of a piece of ammunition. The prime section is a preferred location because it is hard to tamper with this part of ammunition. The primer section of a piece of ammunition is what ignites the gunpowder/propellant. The prime section has a primer compound—which may be a mixture of more than one compound. At least one compound is a pressure sensitive unstable compound that can be ignited by the hammer striking the primer portion of a piece of ammunition. This compound being rather unstable is present in small amounts and only in the primer section. The pressure generated by the hammer leads to ignition of the primer compound, which in turn provides a spark through one or more small holes to the main propellant. This main propellant, once ignited, provides the hot gases that cause the bullet to be accelerated out of the barrel of the gun.

FIG. 2 illustrates the components of an exemplary detectable ammunition cartridge primer section 200 according to an embodiment of the present disclosure. As illustrated the primer section 200 includes a casing engaging part 210 and a flash vent 220 to allow the flash from the detonation of the primer explosive 270 to reach the secondary explosive. Preferably the primer is made with a metal anvil 230 against which the hammer compresses the primer explosive 270 by striking primer cap 250 to detonate it. Illustrated separately are tags 240, placed inside the primer 200 and behind the primer cap 250 and the area where the hammer hits to set off the cartridge of which primer 200 is a part. Tag 240 is coupled to the metallic part, possibly anvil 230, via a thermal fuse 260 and possibly other mechanical connector 480 (for better mechanical stability). In the event the primer receives excessive power via received radiation—sufficient to adversely affect functioning of tag 240—the thermal fuse 260 ignites setting off primer explosive 270, which sets off the cartridge of which primer 200 is a part, thus making it useless for use as ammunition.

In the schematic of FIG. 2 the primer section 200 includes a casing engaging part 210 which anchors the primer section in the piece of ammunition. A flash vent 220 allows the flash from the detonation of the primer explosive 270, and any secondary primary explosive, to reach the propellant that propels the bullet. The primer section includes a metal anvil 230 against which the hammer from the gun compresses the primer explosive 270 upon striking primer cap 250, which application of pressure ignites the primer explosive 270.

FIG. 2 shows tag 240, placed inside the primer section 200 and behind the primer cap 250. Tag 240 may be coupled to the metallic part, possibly anvil 230, via a mechanical connector 260 and possibly fuse 280. In some implementations, attempts to tamper with the functioning of tag 240 by overloading it would also set off the fuse 280, which in turn, will ignite the primer compound and make inactive the piece of ammunition. The illustrated primer section 200 can otherwise be conventional. This aspect is optional and not required for all of the embodiments covered by the claims.

To overcome the interference from the metal cartridge in communicating an electromagnetic signal from the tag in a primer section or in powering a tag using electromagnetic signal from an external Reader, it is preferred that the metal shell be made part of the antenna. This may be implemented in several ways. For instance, the inside of the shell may be made part of a capacitor coupled to the tag to capacitatively couple the tag to the outside. To this end a conducting layer in the inside of the shell/cartridge that is separated by a dielectric layer from the metal shell forms a capacitor. This capacitor is effectively part of an antenna to transmit signals and power to and from the tag inside. In some embodiments protection against tampering by overloading the capacitor may be provided by fuses that ignite the primer compound and render the cartridge non-functional. Alternatively, inductive coupling or providing antenna that are isolated from the shielding by the metallic shield can provide the necessary protection. It should be noted that a combination of ultrasonic and electromagnetic signaling tags present a really difficult target for tampering since even a electromagnetically shielded set of cartridges, bulky though they will tend to be—and thus attract attention—will allow ultrasonic signals through. To this end the tag may sequentially or simultaneously transmit at several ultrasonic frequencies to cover the various thickness to wavelength ratios seen in FIG. 1 to ensure a high enough transmission coefficient at least a few frequencies.

Then there are the price and manufacturing considerations. Each piece of ammunition presently costs a few cents to as much as many dollars. Such low prices make automated manufacturing highly desirable. There is another reason ammunition is preferably made using highly automated production lines because it is hazardous to handle the primer compound and gunpowder accelerant. In view of the lack of stability of the primer compound, even folks who pack their own shells, buy the manufactured primer caps, which when placed in a cartridge become the primer section. The primer caps are made using automated machines because the risk of unintended explosions is very high when handling unstable substances like the primer compound. This reality makes the inclusion of a tag in the primer section a natural tamper resistance design for safer detectable tagged ammunition. Since after firing of a cartridge the tag in it is also destroyed, this placement ensures that signals picked up by Readers are actually from live ammunition and not shell remnants.

Figure 3:
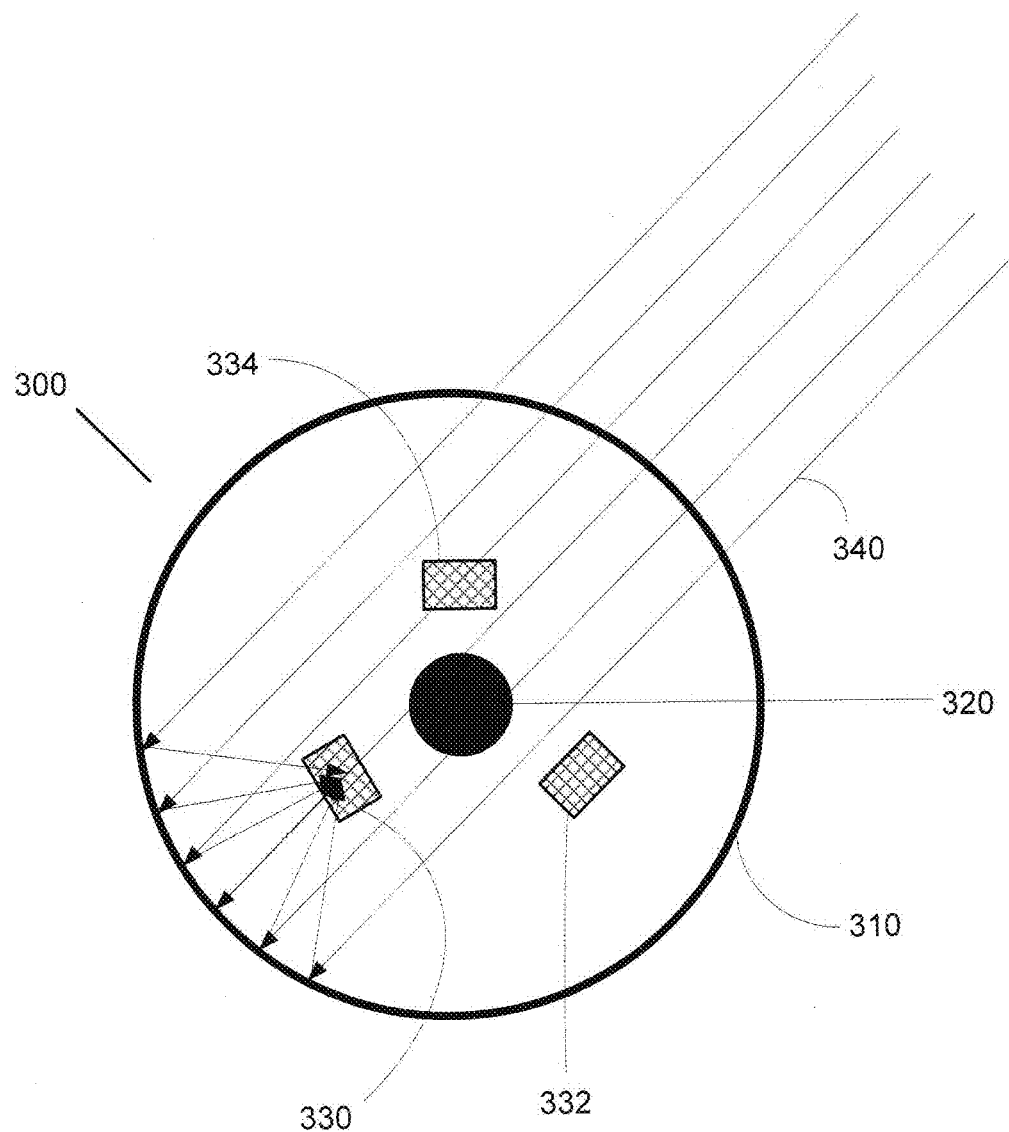
FIG. 3 depicts the use of the shell 310 of a piece of ammunition 300 to focus radiation 340 onto symmetrically placed tags 330, 332 and 334 placed inside the piece of ammunition.
Figure 4:
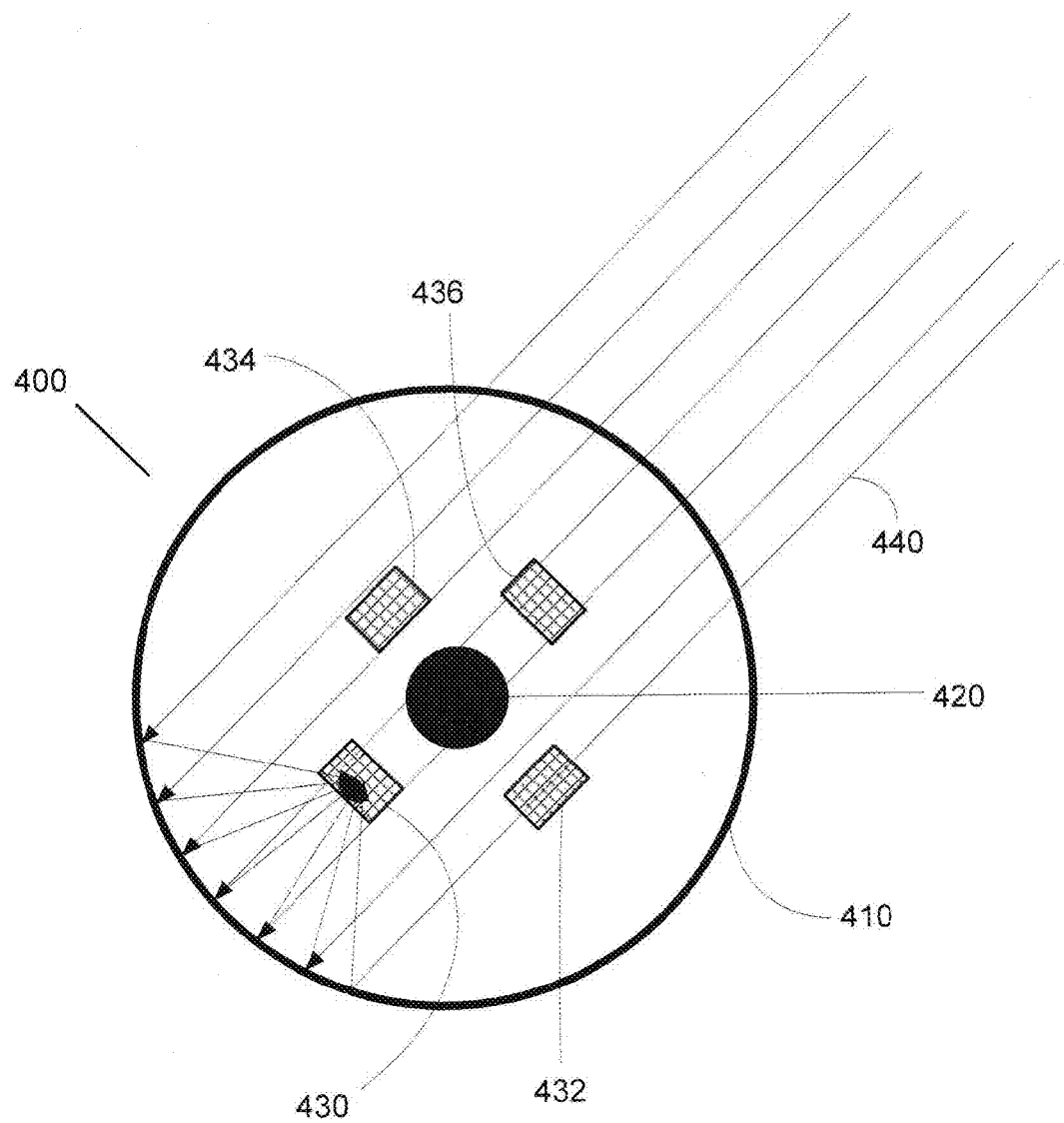
FIG. 4 depicts the use of the shell 410 of a piece of ammunition 400 to focus radiation 440 onto symmetrically placed tags 430, 432, 434 and 436 placed inside the piece of ammunition.
Figure 5:
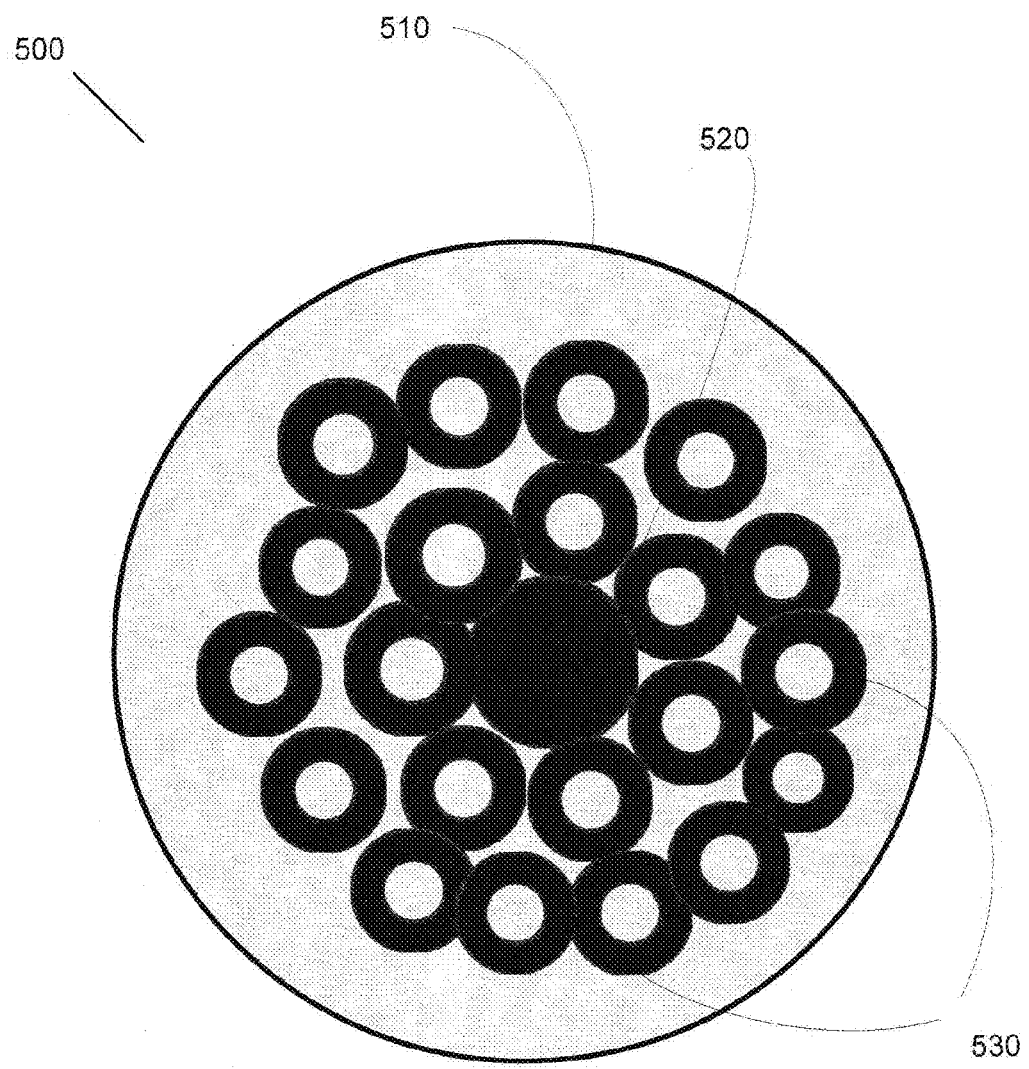
FIG. 5 depicts the use of the shell 510 of a piece of ammunition 500 with assorted tags 530 placed inside a piece of ammunition.

When using tags, particularly ultrasonic tags, there are possible many arrangements for placing the tags in a piece of ammunition other than just inside the primer section. FIGS. 3 & 4 illustrate some symmetrical placements that use the curvature of the casing to focus waves onto the tags within—at about half of the radius of the shell. In FIG. 3 illustrated is the shell casing 310, primer section 320, tags 330, 332, and 334. Also shown is incoming waves 340 that are focused on tag 330 by the curvature of the casing 310. FIG. 4 illustrates a similar arrangement with four-fold symmetry in the arrangement of tags in a piece of ammunition. Use of multiple tags also provides tamper resistance because inactivating all tags is far more difficult than inactivating one or two tags. Non-symmetrical placements that also provide such tamper resistance are illustrated in FIG. 5, which include a tag in the primer section.

Figure 6:
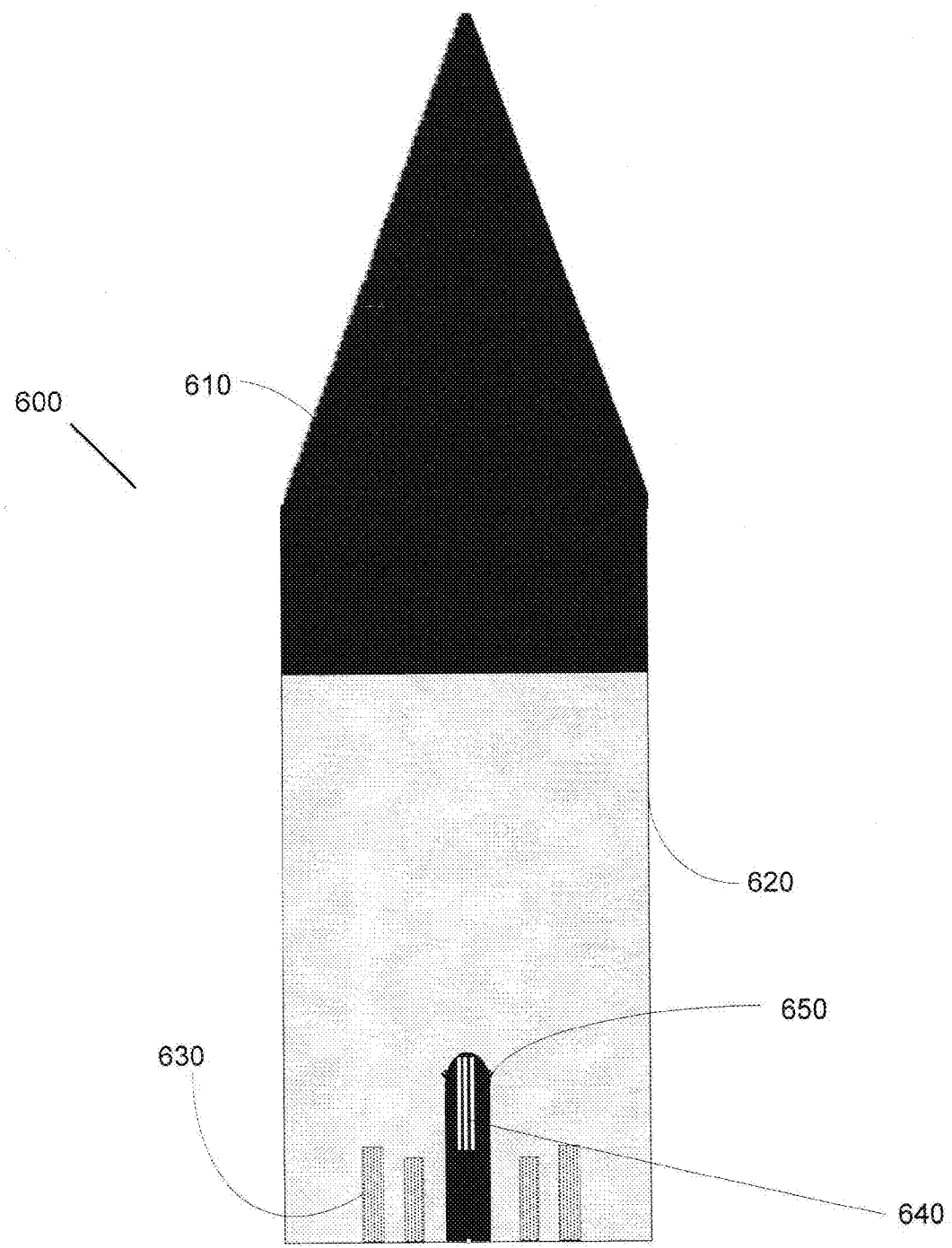
FIG. 6 depicts a piece of ammunition 600 with a bullet 610, a shell 620, tags 630, a primer section 650 with a tag 640 within it.
Figure 7:
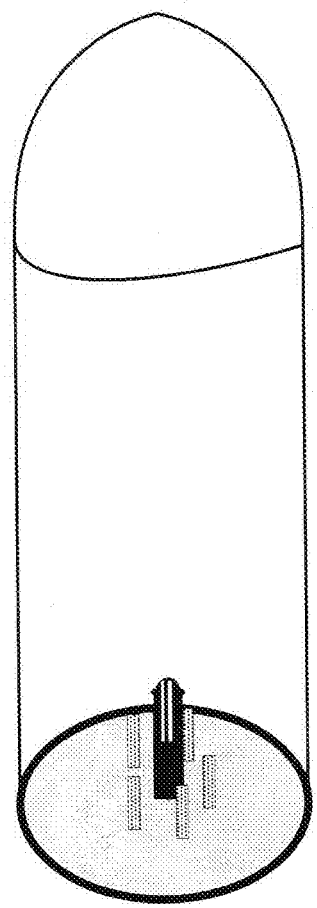
FIG. 7 depicts a piece of ammunition similar to that in FIG. 6 with tags placed within it.

FIGS. 6 & 7 shows how tags may be placed or packed in a piece of ammunition as viewed from its side. In FIG. 6 the bullet part 610 is held in the casing 620, in which are embedded in the propellant tags 630. A tag 640 is also placed in the primer section 650. In these illustrative embodiments, if the casing is a shielding metal, then preferably the tags are UIDs. If an antenna is provided in communication with a tag, then the tag advantageously uses RFID technology.

There are several options for making prototypes and manufacturing ultrasonic tags, some of which are described next. Our interactions with various laboratories and other research reveal that the tags are possible. DARPA has been exploring the design and fabrication of 'motes' for networked sensors that are very small being of the order of a few millimeters at best. Since the tags proposed here need relatively simple circuits due to the absence of a requirement to send extensive information—such as serial numbers—the design challenges are easier. Further, with such simple detection requirements the problems of collisions between transmissions from multiple tags are not only not encountered, but such transmissions make the desired better for our applications. It should be noted, however, that individuals may elect to buy tagged ammunition with more functionality built into the ammunition. Thus, some ammunition may include tags that communicate specified signals in the absence of which a firearm may not fire. This precaution may allow ammunition to be stored separately to make it difficult for children and unauthorized individuals to use a firearm. This is similar to the designs that require close proximity of the firearm to a band with a RFID tag to prevent unauthorized users from discharging the firearm. Other implementations include biometric identification built into the firearm to prevent unauthorized users from using the firearm. The use of tagged ammunition can be readily adapted to extend these approaches to provide even more secure and safe firearms.

In an exemplary design, illustrated in FIG. 2 by fuses 260, the tags may be attached in the prime section using fuses that would cause discharge of the ammunition if it is tampered with to disable the tags. This possibility may make firearms safer by allowing law enforcement officers to neutralize an attacker in a non-lethal manner by causing premature detonation of the ammunition by a directed beam of high energy radiation. This feature, if implemented, does not interfere with lawful uses of firearms in self-defense or hunting while helping in diffusing hostage situations with far fewer casualties.

ZnO, a piezoelectric material, may be used to make the components responsive to ultrasound. ZnO is able to interact with traditional field effect transistors and components to lower manufacturing cost of tags. Several laboratories at various Universities have been exploring ZnO based circuits. Other piezoelectric materials may be used as well. It is expected that with mass manufacturing the cost of adding tags to each piece of ammunition will drop significantly.

For tags in general, the energy harvested from the radiation, ultrasonic or electromagnetic, received from a reader may be used to charge a supercapacitor. Upon reaching a threshold, the supercapacitor discharges by driving the signal generator to send a response back to the reader. OptiXtal in Philadelphia, a maker of some of the best supercapacitors, for using their supercapacitors for implementing tags has developed energy harvesting devices. The testing of prototypes to determine parameters such as the mechano-electrical coupling for harvesting energy from ultrasonic waves or the size of transmitters required in the readers to allow energizing of passive tags is envisaged. DARPA (Defense Advanced Research Project Agency funded development of motes that could harvest energy from vibrations to drive internal circuits provides a possible implementation framework. Additional details for energy harvesting of passive RF energy are described, for instance in U.S. Pat. Nos. 6,259,372; 8,552,597. Additional references describe technology familiar to one having ordinary skill in the art for harvesting energy from vibrations such as Mehraeen et al. in IEEE TRANSACTIONS ON INDUSTRIAL ELECTRONICS, VOL. 57, No. 3, MARCH 2010; Erturk et al. in Proc. SPIE 6928, Active and Passive Smart Structures and Integrated Systems 2008, 692801 (Apr. 4, 2008); Johnson et al. in Proc. SPIE 6169, Smart Structures and Materials 2006: Damping and Isolation, 616900 (Mar. 15, 2006); and Knight et al, in Proc. SPIE 7288, Active and Passive Smart Structures and Integrated Systems 2009, 72880A (Apr. 6, 2009).

II. Readers

Powering the Tag:

For reading passive tags, the reader has to power the passive tag and then to receive the transmission from the tag. The reader, thus, either covers the area of interest with sufficiently powerful radiation to interrogate the tags or scans the area rapidly enough to interrogate the tags while receiving their response.

Locating Tags:

Tagged ammunition is located by triangulation or directional detection with a combination of several readers. Mobile networked readers worn by security personnel allow triangulation to locate an unauthorized armed individual—for instance in a crowd and provide sufficient warning to security personnel to allow neutralization of the risk posed by such a person. Triangulation is a technique that is well known to those having ordinary skill in the art. It is used widely to locate positions or objects using three overlapping independent position determinations, including even relatively modern techniques such as GPS.

Reader:

A Reader means a device to query a tag, and to receive a signal from a tag. A tag may be responsive to electromagnetic radiation or to ultrasonic radiation. The Reader includes the facility to detect a signal sent by the tag. Preferred Readers detect ultrasonic signals. However, Readers that detect electromagnetic signals are also included in the definition of a Reader.

Reader Location:

Readers may also be installed in gateways, or in locations near gun cases or ammunition storing areas to locate unexpected movement of ammunition or firearms. One method proposed to make firearms safer includes placing a GPS tag in firearms so that an App on a smartphone reports any movement of the firearm. The tagged ammunition allows a similar implementation focused on the movement of ammunition by having a reader communicate to a smartphone App any unexpected movement of ammunition. In another aspect, a reader may be temporarily deployed to deter domestic violence when there is a court order of protection. The reader will detect the presence of ammunition in its vicinity and if suitably placed on the protected premises, inform security personnel of an impending threat even before a call is placed to summon help. Another application is in tracking and controlling the use of guns on the street. Presently the favored approach is to profile and intrusively search individuals to locate guns. This approach, likely unconstitutional, requires intrusively searching minority men and youth to the point that traversing streets unmolested is not a reasonable option in many urban neighborhoods. It is not uncommon for 95% of those searched to have no firearms. However, with a reader, the police can determine individuals who are carrying ammunition in an area where firearms are not allowed. Searching them is far more likely to be in compliance with the Constitution and also designed to further public safety and public confidence.

In another aspect, readers may be portable or be fixed installations. The location or readers may not be disclosed or may even be changed frequently to counter efforts at shielding ammunition from them. Since many of the tags do not include identifying information as a basic requirement, it is possible to deploy such readers even in areas like public restrooms without any invasion of privacy.

Triangulation in large spaces is not the only way to usefully deploy readers. They may be used to monitor if ammunition is moved from its storage location with such movement reported to a specified smartphone via an App. Similarly, if a residence is required to be off limits due to a protective order, including one to protect a suicidal or depression prone person, the presence of ammunition can trigger an alarm with suitably positioned readers. In an law enforcement application, while patrolling police may use a portable reader to identify individuals with ammunition as a prelude to a more complete search while steering clear of the heavy hand associated with stop and frisk policing methods to locate and neutralize firearms.

Narrow Beams and Raster Scans:

The use of ultrasonic tags is preferably facilitated by readers with somewhat different designs. It is easier to generate narrow band ultrasonic beams. Thus, it is preferable that the readers have the ability to raster scan an area of interest. Furthermore, the receivers for detecting ultrasonic energy also tend to be very directional. Thus, an array of receiving elements oriented about an axis to cover a solid angle of interest will provide effective coverage of an area of interest. Further, by including a range of frequencies—such as to cover an octave—it is possible to generate at least one beam that is transmitted to the tags within the ammunition.

One advantage of ultrasonic readers is that their narrow directional characteristics allow the readers to use less energy while interrogating tags in ammunition. The directional nature also assists in better locating live ammunition since the strength of the signal and its direction are both available to compute the likely location. The ultrasonic spectrum is also far less crowded, which improves the reliability of detection events.

To make effective readers and tags responsive to ultrasonic vibrations, anisotropic piezoelectric materials will be used to both generate ultrasonic energy and to receive signals from tags. For receiving ultrasonic signals anistropic cantilevered structures may be used to convert received signals into electrical signals. The cantilevered structures are preferably designed to resonate with the ultrasonic frequency of interest to improve reception. Powering the cantilever design by electrical signal will cause transmission of an ultrasonic signal at the driving frequency. The fabrication of preferred readers for detecting ultrasonic vibrations requires lithographic techniques similar to those used for energy harvesting.

The Response of a Tag:

Preferably the signal sent back from a tag is at a frequency different from that used to energize the tag to allow it to be differentiated from a reflected signal. A lower frequency is favorable in reducing the energy demands on passive tags. For powered tags, it is advantageous to use a solid state electrolyte connect metals used to make the ammunition to provide a battery that has a lifetime similar to that of the piece of ammunition. As the metal used erodes, so does the efficacy of the piece of ammunition even though the tag retains the ability to function as a passive tag and be read by suitable readers.

Figure 8:
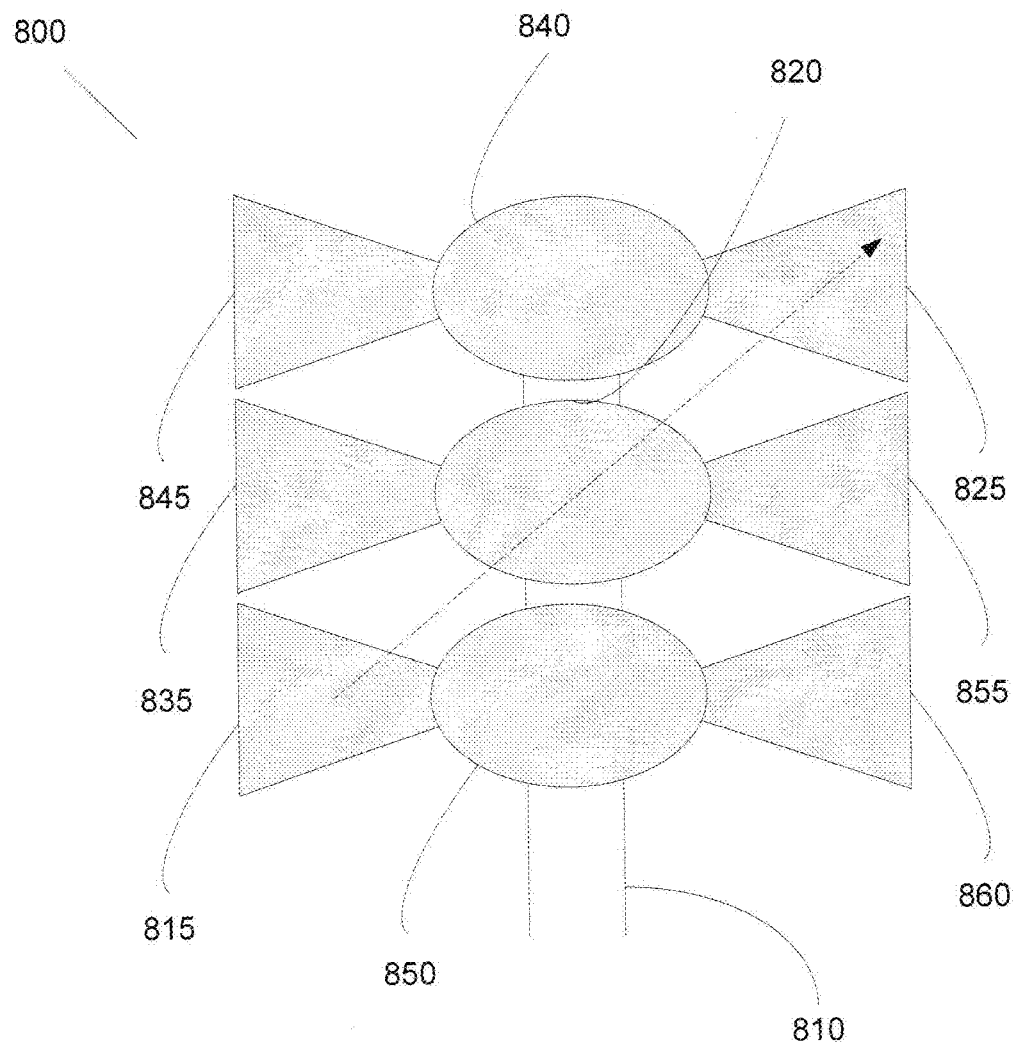
FIG. 8 shows a schematic of a reader 800 with fixed components for interrogating tags using simulated raster scanning to power tags and receive signals from the tags. Shown is a communication backbone 810 connected to directional radiators/receivers 815, 820, 825, 830, 835, 840, 845, and 850.

At the reader, the signal may be picked up as a difference signal between two sensors—one facing the tags and the other facing away from the tags to cancel out the ambient noise. FIG. 8 shows a possible arrangement of generators and receivers that simulate a raster scan of the space facing the reader. To simulate a raster scan the generators are energized in sequence. Thus, generators 815, 820 and 825 activated in sequence simulate a scan of the space in front of them. Similarly, a receiver array—possibly similar to the array shown in FIG. 8—receives the signal from the tags and infers a direction and distance based on the strength of the signal and the particular receiver that receives the signal. Multiple such readers may be networked to allow triangulation to locate a person with ammunition.

It is also noted that the present invention in its preferable form does not require any type of database to be maintained because the ammunition changes its impedance, as seen by the reader, at least at one rate and preferably at two or more defined rates to allow its detection by the reader that happens to be close enough to couple to the tags in the cartridge. As such, although privacy is maintained, the presence of bullets or of loaded firearms in the vicinity of suitable readers is readily detected.

Alternative embodiments are also envisioned in which a passive tag may be replaced by a semi-passive tag. A semi-passive tag interacts with the reader in the manner of a passive tag, but does include a power source. Thus, if the power source runs out, the tag functionality can still function like a passive tag, albeit with a shorter range.

Figure 9:
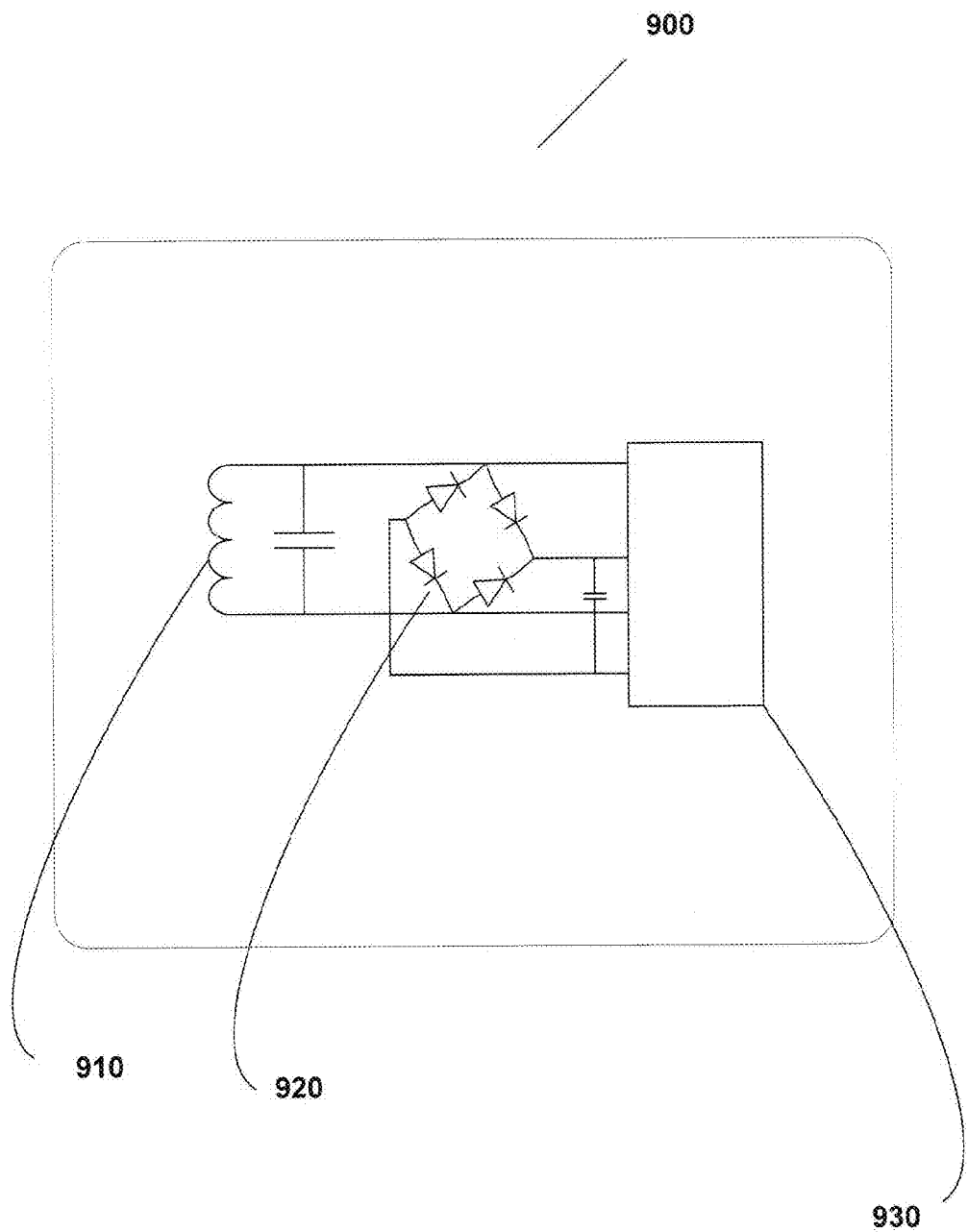
FIG. 9 is an illustrative schematic of a passive tag with a circuit for harvesting energy from electromagnetic radiation.

An exemplary schematic implementation for passive tags is shown in FIG. 9. As seen in FIG. 9, a passive RFID 900 has a coupling circuit 910 that is connected to a rectification stage 920 that powers an impedance modulation stage 930 that may simply reflect the signal back or modulate it at one or more frequencies by changing the impedance sensed by a reader coupled to the passive RFID 900.

When fired, it is likely that the tags in bullet are destroyed when the bullet is of otherwise conventional manufacture. However, the tags may be stamped or marked with an identifier so that if they survive, the cartridge shell can be examined to determine the serial number of RFIDs in the primer section to ascertain the batch or other identifiers associated with manufactured ammunition and the like. This detail is not required to practice the disclosed methods and systems.

In yet additional embodiments, it is envisioned that additional tags may be placed elsewhere in the detectable cartridge. It should also be noted that having the tags distributed in a cylindrically symmetric fashion will least affect the performance of the cartridge. Such placement of tags is best accomplished during the automated manufacturing of ammunition.

Simplest RFIDs have only antenna and diodes (to receive rectified power from the reader). These tags mostly reflect signals incoming from transmitters—or may additionally modify the signal slightly by modulating it by changing their internal impedance as seen by the reader. Such passive RFID tags are used in supermarkets and other places for securing goods from stealing. If signal, or a slight variant thereof, is reflected, an alarm is triggered. It is preferable to use such passive RFID tags that can reflect a slightly modified variant of the reader signal in ammunition because of their low cost, small size, and ease of fabrication.

A big stumbling block in various schemes for improving firearm safety has been the politics of regulating firearms. The political reality is that given the number of guns already in circulation—estimated at about 300 million in the USA—it is impractical to curb firearm based accidents and attacks by merely targeting the design of guns. Ammunition, on the other hand, has a far shorter half-life than guns. Due to its use and the unstable compounds used in it, it tends to become increasingly unreliable with age. Therefore a push to require all ammunition sold in or imported into the United States to be tagged ammunition is far more likely to be adopted since such ammunition improves public safety without interfering with lawful uses of firearms. If such a law includes tax subsidies for switching over production lines to make tagged ammunition, the political resistance to such a change is expected to be surmountable. Additional provisions providing for exchanging existing ammunition with tagged ammunition will make the adoption of tagged ammunition relatively painless.

Since the tagged ammunition need not include any identifying information, it is unlikely to invoke the specter of an over-intrusive State/Government seeking to take anyone's guns away or seeking to undermine the right to bear arms. At the same time, given the weight of the American market for firearms, adoption of such a law will not only result in similar provisions being enacted into law elsewhere, but also in compelling manufacturers into adopting practices most friendly to preserving access to the American market—even including manufacture of tagged ammunition.

However, one sector of the economy is unlikely to adopt tagged ammunition. The military has very particular requirements for its weapons and ammunition. As long as untagged military ammunition is not sold into the civilian market as military surplus, the impact of a variant standard being adopted for ammunition used by the military will have minimal adverse impact on improvements to public safety made possible by tagged ammunition. Tight control over military ammunition is desirable in any event—as would be the case here.

It should be noted that preferably all ammunition sold to civilians or imported into the jurisdiction of interest should be required to be detectable by RFID readers. Such ammunition will likely include hybrid cartridges that use non-metallic jackets although it is possible to integrate a metal jacket into a micro-patch antenna structure for the pRFID with suitable modification of the primer configuration to accommodate such structures. Where additional RFIDs are placed in other locations in the cartridge, additional patch antenna structures may be provided or integrated into the cartridge shell design. Such embodiments make it possible to ensure that all civilian cartridges are safely detected and vetted when they are carried into a public place where security is a concern while making tampering with ammunition to disable its detectably difficult. Merely exposing the ammunition to intense radiation will be insufficient to inactivate the pRFIDs and instead cause the cartridge to go off. Further, wrapping such cartridges in metal foil and the like to defeat detection by a RFID reader will make the resultant cartridges non-standard and more likely to cause a jam in a weapon. Further, when used in combination with a metal detector, a RFID reader will readily detect suspicious metal wrappings and help trigger an alarm should metal wrapped cartridges actually escape detection by the RFID reader.

The disclosed detectable ammunition is sorely needed and useful since it also allows monitoring of neighborhoods and streets for gun related activity without having to have independent evidence of reasonable suspicion for conducting a stop and search operations that otherwise tend to focus unfairly and illegally on minorities and other profiled groups. Now, with an RFID reader it is possible to actually target those with reasonable probability of being a hazard to others provided congress or another competent rule making body passes a law to require the use of such ammunition in all civilian firearms, for instance, in the United States. Law making institutions in other jurisdictions can do the same to allow monitoring in other jurisdictions to reduce avoidable harm by way of mass shootings due to irresponsible use of firearms.

Additional embodiments include RFID tags designed to capture energy not only from a reader but from vibrations. To this end, the RFID tag includes a piezoelectric cantilever etched out by lithography to allow sensing of vibrations and to capture their energy for use in transmitting appropriate signals. In response to detecting a strong enough reader signal, the tag, powered by its captured energy, transmits/changes its impedance at a rate sensed by the reader. In a preferred arrangement, a single RFID transmits/couples at a first frequency and in response to detecting the presence of another RFID close by, it transmits at a second frequency. Thus, if there are multiple cartridges present close to each other, they indicate it by a distinct frequency. Further, the multiple RFID tags in multiple cartridges attempt to synchronize their responses to make their signal stronger. A reader then is sensitively able to detect large amounts of ammunition. Further, the harvesting of mechanical energy from vibrations makes the arrangement tamper resistant. To summarize, in a preferred tamper resistant embodiment, the RFID tag harvest energy from vibrations and uses it to communicate with a reader upon detecting the presence of a reader. The RFID tag responds at one frequency if it does not sense other cartridges, and at a second frequency if detects the presence of anther cartridge in its vicinity with an attempt to synchronize its communications with that of the other cartridge. Thus, a collection of cartridges responds to a reader with a stronger distinct signal if multiple cartridges are present in each-others vicinity. The RFID tags in this embodiment are preferably located in the primer section and may further include a fuse similar to those described previously.

It is apparent that the above embodiments may be altered in many ways without departing from the scope of the invention. For example, many embodiments could use a micro-patch antenna with an RFID chip such that the micro-patch antenna is a part of cartridge metal casing. Further, various aspects of a particular embodiment may, contain patentable subject matter without regard to other aspects of the same embodiment. Still further, various aspects of different embodiments can be combined together. All references cited herein are incorporated herein by reference for all purposes. Accordingly, the scope of the invention should be interpreted in a manner consistent with these principles and in light of the following claims.

We claim:

1. A piece of ammunition detectable by a reader, the piece of ammunition comprising:
    a tag located in a primer portion of the piece of ammunition;
    a power storage component to power a signal emitting circuit in the tag; and
    a receiver for receiving power or a signal external to the piece of ammunition.

2. The piece of ammunition of claim 1, wherein the power storage component is selected to be a passive energy storage component charged by an external reader or an energy storage component charged by mechanical vibrations.

3. The piece of ammunition of claim 2, wherein the mechanical vibrations are received by the receiver and converted into electrical power by way of a miniaturized cantilever and a piezoelectric material.

4. The piece of ammunition of claim 2, wherein the passive energy storage component is charged by ultrasonic radiation following conversion into electrical energy or by electromagnetic waves.

5. The piece of ammunition of claim 2, wherein a signal emitting circuit emits an electromagnetic signal or an ultrasonic signal.

6. The piece of ammunition of claim 1, wherein the signal emitting circuit causes emission of an electromagnetic signal or an ultrasonic signal in response to (a) receiving a query signal; or (b) upon sufficient energy being stored in the passive energy storage component.

7. The piece of ammunition of claim 6, wherein the signal emitting circuit responds to a signal from a reader by emitting a signal indicating the presence of the tag.

8. The piece of ammunition of claim 1 wherein the tag is located in the primer section of the piece of ammunition that is coupled to a cartridge housing for manufacturing the piece of ammunition.

9. The piece of ammunition of claim 1 having a tag located in a primer section and which tag is a passive Radio Frequency Identifier that changes its impedance at two or more rates periodically or even reflects back the signal received from the reader.

10. The piece of ammunition of claim 1 having a tag located in a primer section and which tag comprises a circuit for modulating the signal received from the reader by changing its impedance.

11. The piece of ammunition of claim 1 having a tag located in a primer section and which tag is a remnant of a semi-passive Radio Frequency Identifier after a built-in battery runs out or the battery for which tag comprises an electrolyte sandwiched between metal electrodes that also function as part of a cartridge in the piece of ammunition.

12. A reader of detectable ammunition for detecting the piece of ammunition of claim 1, the reader comprising:
    a power and signal port compliant with specifications for a smart phone to allow plugging in the reader into a smart phone; and
    a detector for receiving a signal from detectable ammunition.

13. The detector of the reader of claim 12 wherein the detector is a directional detector of ultrasonic signals.

14. The reader of claim 12 wherein the smart phone further includes software to allow integration of signals detected by additional readers in the vicinity to map detectable ammunition in the vicinity.

15. A method of securing an area of interest, the method comprising the steps of:
    placing at least one networkable reader in a vicinity of the area of interest;
    and connecting the at least one networkable reader to a monitoring center responsive to a detection of ammunition detectable via passive or semi-passive Radio Frequency identifiers or Ultrasonic Identification Device housed within primer section of the ammunition.

16. The method of claim 15 wherein the monitoring center is associated with one or more of a school, a shopping mall, a street, a public meeting, a public event, a housing complex, an area being swept for loaded guns, an area being monitored for gang activity, and a residence where firearms are prohibited or controlled.

17. A primer section, in a piece of ammunition, detectable by a reader, the primer section comprising:
   a tag;
   a power storage component to power a signal emitting circuit in the tag; and
   a receiver for receiving power or a signal external to the primer section.

18. The primer section of claim 17 wherein the power signal emitting circuit reflects back the signal received from the reader or changing its impedance to signal the reader; and
   a thermal fuse coupled to the tag wherein excessive current induced in the thermal fuse triggers the primer explosive.

19. The primer section of claim 17 further comprising a vibration detecting circuit that harvests power for the tag from vibrations, wherein furthermore the harvested vibrations are low frequency mechanical vibrations or ultrasonic vibrations.

20. The primer section of claim 18, wherein the tag responds at a second frequency in response to detecting the reader and the presence of at least another tag in its vicinity, or the tag attempts to synchronize its response with the transmissions of the at least another tag.

* * * * *